United States Patent [19]

Schmitz

[11] 4,369,875

[45] Jan. 25, 1983

[54] APPARATUS FOR ISOLATION AND SUPPLY OF OBJECTS, IN PARTICULAR SWEETS, TO A PACKING MACHINE

[75] Inventor: Heinz Schmitz, Hurth-Efferen, Fed. Rep. of Germany

[73] Assignee: Firma Rose Verpackungsmaschinen-Fabrik Theegarten GmbH & Co. KG, Cologne, Fed. Rep. of Germany

[21] Appl. No.: 173,276

[22] Filed: Jul. 29, 1980

[30] Foreign Application Priority Data

Aug. 10, 1979 [DE] Fed. Rep. of Germany ....... 2932431

[51] Int. Cl.³ ...................... B65G 47/26; B65G 47/31
[52] U.S. Cl. .................................... 198/456; 198/461
[58] Field of Search ............... 198/461, 456, 425, 723, 198/598, 478, 481, 458

[56] References Cited

U.S. PATENT DOCUMENTS

| | | | |
|---|---|---|---|
| 3,164,240 | 1/1965 | Banks | 198/723 |
| 3,538,675 | 11/1970 | Schmitz . | |
| 3,717,236 | 2/1973 | New | 198/478 |
| 4,228,888 | 10/1980 | Bruno | 198/461 |

*Primary Examiner*—John J. Love
*Assistant Examiner*—Brian Bond
*Attorney, Agent, or Firm*—Meyer, Tilberry & Body

[57] ABSTRACT

Apparatus for isolating and feeding objects, particularly sweets, to a packing machine in which objects are transported on a conveyor in a longitudinal row closely one behind the other, displaced sideways one at a time and accelerated to a higher speed spaced longitudinally from one another. Sideways displacement is provided by pressure pieces moving longitudinally with the objects and providing abutment stops for the next succeeding object to be isolated. Part of the rear face of each object is exposed by the sideways motion and a dog of a dog-chain engages the object at this point at the same speed as the pressure piece and then accelerates the object engaged by it such that the row of objects is longitudinally spaced one from another.

9 Claims, 4 Drawing Figures

APPARATUS FOR ISOLATION AND SUPPLY OF OBJECTS, IN PARTICULAR SWEETS, TO A PACKING MACHINE

This invention relates to apparatus for isolating and supplying objects, in particular sweets, to a packing machine, in which objects which lie closely one behind the other in a row on a longitudinal conveyor are one after the other separate out from the row in such a manner that their rear faces are freed, behind each of which one dog of a dog-chain engages and supplies the objects in a spaced-apart relationship to the packing machine.

An apparatus of this type is known (DE-OS No. 28 49 586), in which the objects which arrive on a lower conveyor are one after the other raised up by the steps of a moving staircase and are conveyed onwards at a higher speed on an upper conveyor by the dogs of a dog-chain. In this known conveyor it is difficult to retain on the lower conveyor the particular object which follows the one being raised up by the lowest step of the moving staircase as it abuts with its front face on the preceding object and is drawn up with it. Furthermore, the dogs of the dog-chain which circulates in a vertical plane have a higher speed than the objects which arrive on the upper plane so that they initially receive a shove from the dogs until they are conveyed onwards in a spaced-apart relationship. Both facts cause disorder in the conveying passage so that the known apparatus can only be operated at a limited speed, as at higher speed malfunctions occur in the work cycle.

For isolating and supplying sweets to a packing machine there is further known other apparatus (DE-OS No. 16 11 895) in which the sweets are supplied to a compartmented wheel which has a number of pockets on its circumference in each of which a single sweet is positioned. The sweets are then each pushed out of these pockets by a respective pin of a dog-chain which is positioned on the inside of the dog-chain and whose speed of advancement is reduced in the region of a return wheel of the dog-chain so that it is of the same magnitude as that of the peripheral speed of the compartmented wheel. After engaging behind the sweet, the dog first accelerates it continuously to a higher velocity which is then maintained. This known apparatus, although it functions faultlessly, is only suitable for a throughput of up to about 450 sweets per minute, as with higher through-puts the supply of sweets to the compartmented wheel becomes difficult. Further, only sweets and other objects of particular shapes can be supplied to the compartmented wheel.

It is an object of the invention to provide apparatus for isolating and supplying objects to a packing machine, which does not have the disadvantages of the known apparatus, which can work at very high speeds, which can achieve a high throughput, and which can also be used to isolate and supply to a tube packing machine or to a packing head of some other packing machine objects with a square or rectangular base.

According to the invention this object is achieved by pushing the objects one after the other so far sideways out of the row by pressure pieces that at least a part of the rear face of the displaced object is freed for the engagement of a dog of the dog-chain, and the front edge of the next object in the row abuts the pressure piece while the velocity of the engaging dog at the time of engagement is the same as that of the displacing pressure piece.

This embodiment has the advantage that isolation of the objects, for example sweets or chocolates, proceeds without any shocks in a single plane, so that high working speeds can be achieved. The objects are subjected neither to the stress of a push or blow nor are they dragged, and they only undergo relatively small displacement relative to each other and their base while they are still abutting one another.

According to a further characteristic of the invention the pressure pieces are spaced apart approximately the length of the objects and fixed to a transporter which travels in a closed path which is curved at least in the region of the isolation station, which path is tangential to the path of the longitudinal conveyor. This has the advantage that the pressure pieces which push the objects sideways out of their conveying path are moving simultaneously with the objects in their longitudinal direction. The row of objects lying on the longitudinal conveyor thus does not repeatedly hit an abutment stop and need not thereafter be accelerated again by the longitudinal conveyor. Instead, the objects during their longitudinal displacement are continuously displaced sideways by the pressure pieces, whereby the displacing pressure piece simultaneously serves as an abutment stop for the following object of the row being supplied by the longitudinal conveyor which abutment moves onwards with the preceding object in the longitudinal direction.

The pressure pieces can be arranged in a circle and spaced-apart from each other on a circular transporter, which rotates about an axis perpendicular to the plane of conveying and beyond whose base the pressure pieces project. Suitably the pressure pieces are angle-shaped shoes, which are firmly fixed to the planet wheels of a planet gear arrangement so that the shoes do not change their angular orientation during orbit of the planet wheels about the axis of the arrangement. The angle-shaped pressure pieces thus maintain their angular orientation during orbit about the axis of the arrangement, such that they are displaced in a circle parallel to each other. This embodiment has the advantage that each pressure piece, as soon as it abuts an object, applies only a very slight tangential acceleration and that the tangential deceleration as the pressure piece disengages from the object after its sideways displacement has no effect on the object to be transported.

Suitably the longitudinal conveyor has lateral guide-walls for the objects which end at that location where the pressure pieces impinge on the objects in order to displace them sideways. Thus, when one object is displaced sideways, the next following object is provided with a sufficient counter-bearing by the lateral guidwall lying opposite the pressure piece so that malfunctions in advancement do not occur, even at high advancement speeds.

According to the invention, the dogs are carried by carrier members on the facing inner sides of the links of an endless chain which carrier members project into the space surrounded by the endless chain while the chain runs around a return wheel in the region of the isolation station. This results in the travel of the dogs in the region of the isolation station being slowed down so that the dog which engages behind the respective object has the same speed as the latter, before it gathers speed in the straight part of the chain's travel and thus accelerates the object to be isolated and conveys it on at a uniform higher speed, as is known per se from DE-AS 16 11 895.

It is to be recommended that the dog-chain and the transporter be arranged to overlap above the longitudinal conveyor in the region of the isolation station in such a manner that the dogs of the dog-chain engage between the pressure pieces of the transporter. Such an arrangement takes up relatively little space and can easily be monitored and serviced. The dog-chain can run around in a horizontal plane with the dogs directed downwardly.

Further characteristics and advantages of the invention can be seen from the following description and the drawings, in which a preferred embodiment of the invention is shown and described in detail. There is shown in:

FIG. 1, a schematic representation of the apparatus according to the invention in plan view;

Figure 1:
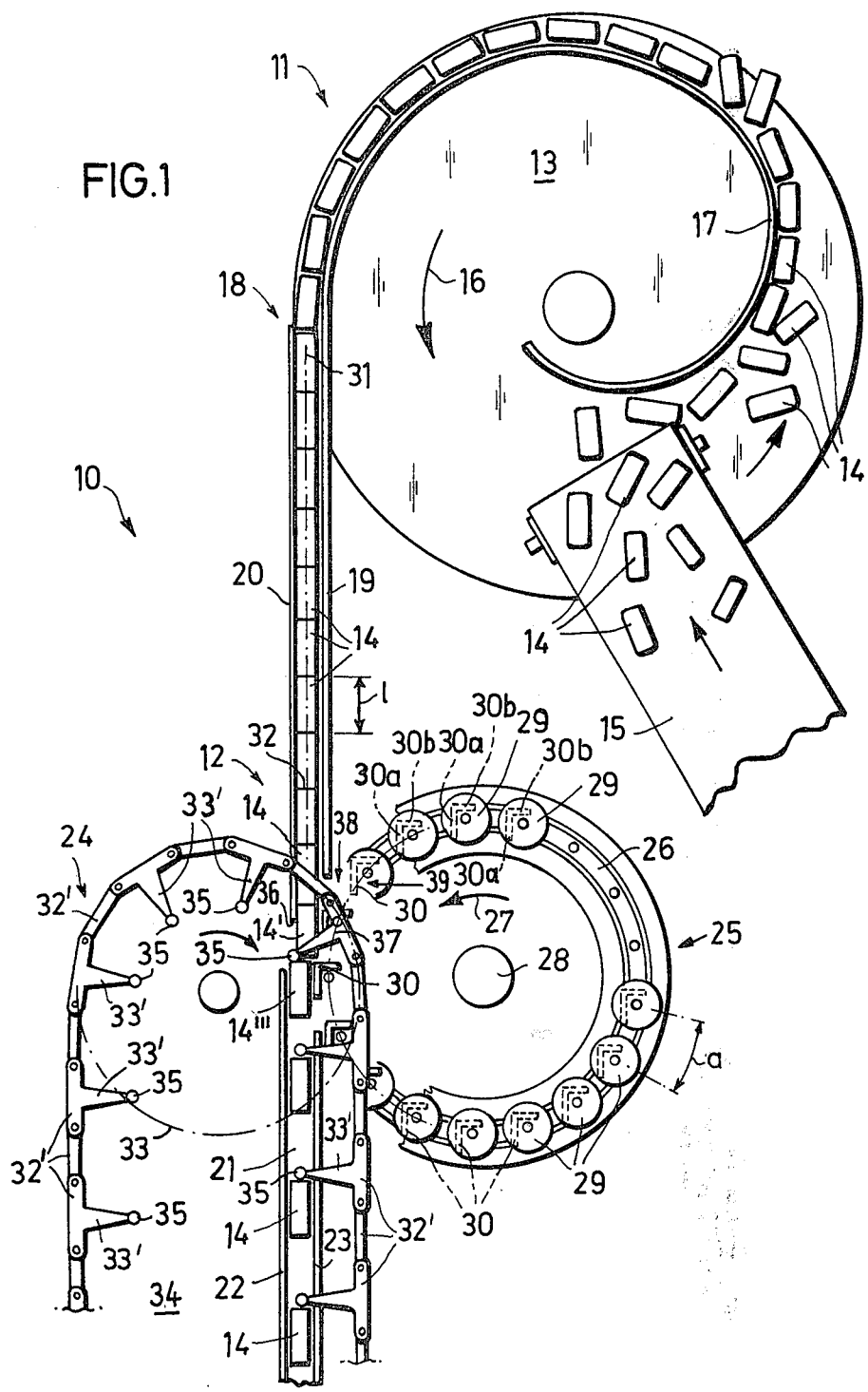
Figure 2:
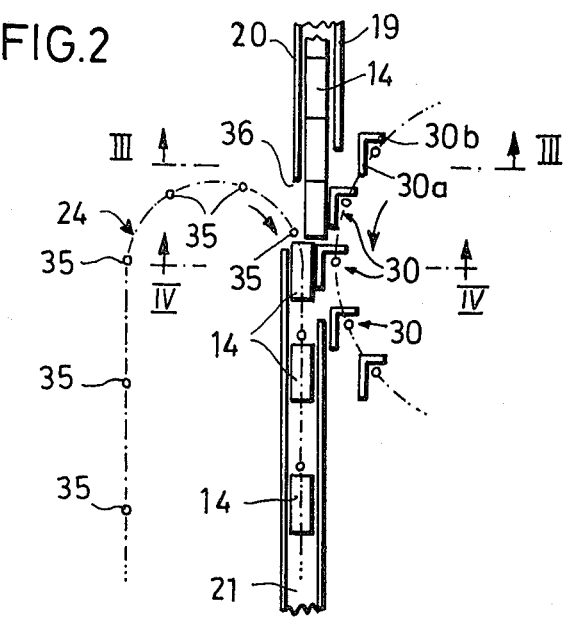
FIG. 2 shows a detail of FIG. 1 in a lower lying horizontal section, in which the dog-chain and the transporter are only indicated by dot-dash lines.

In the drawings 10 designates conveyor means for supplying sweets to a tube packing machine, which comprises a sorter 11 and an isolation station 12. Sweets 14 are supplied to the sorter 11 by a conveyor 15, which ejects the sweets 14 lying randomly on it onto a sorter disc rotating in the direction of arrow 16. Here the sweets 14 are displaced along a spiral guidewall 17 and are thereby so orientated, that lying one behind the other they arrive on a longitudinal conveyor 18, which supplies them to the isolation station 12. The longitudinal conveyor can, for example, be a conveyor belt or a toggle conveyor, which has lateral guidewalls 19 and 20 which end in the region of isolation station 12.

Figure 3:
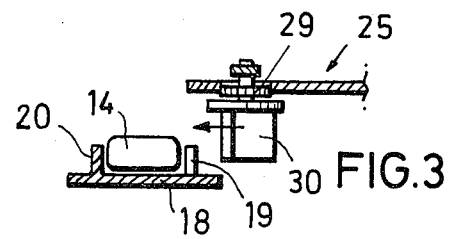
FIG. 3 is a sectional view of the apparatus along line III—III of FIG. 2.
Figure 4:
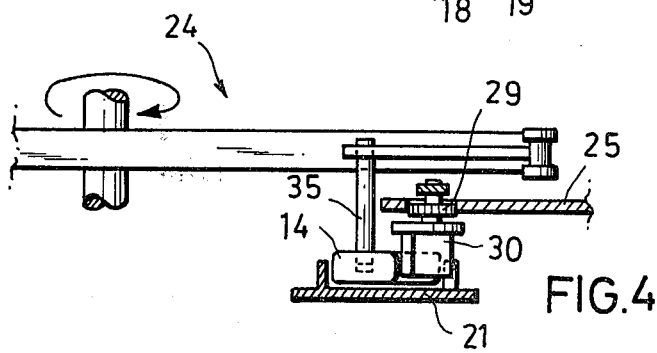
FIG. 4 is a sectional view of the apparatus along line IV—IV of FIG. 2.

The isolation station 12 comprises substantially a discharge table 21 arranged in the same plane as longitudinal conveyor 18 and having lateral guidewalls 22 and 23, a dog-chain 24 and a transporter for lateral displacement of the sweets lying on longitudinal conveyor 18, which transporter as a whole is referenced 25. The dog-chain 24 and the transporter 25 are arranged in different planes on opposite sides of the longitudinal conveyor 18 or discharge table 21 respectively and above conveyor 18 (see FIG. 3 and FIG. 4).

The transporter 25 consists of a type of planet gear whose ring-shaped planet carrier 26 rotates in the direction of arrow 27 about a vertical axis 28. A plurality of planet wheels 29 are rotatably mounted on planet carrier 26, each of which planet wheels carries on its underside a pressure piece 30 having the shape of an angle-shaped shoe. The planet wheels 29 are spaced about the circumference by a distance (a), which corresponds to the length (l) of the objects, which are transported on the longitudinal conveyor 18 and which are to be isolated in isolation station 12 and to be brought into longitudinally spaced-apart relationship to one another. The planet gear of transporter 25 is so arranged, that the angle-shaped shoes do not change their angular orientation during orbit of the planet wheels 29 about the sun wheel of the gear which is not illustrated in detail, so that the shanks 30a and 30b of the angle-shaped shoes of each pressure piece 30 remain parallel to each other during their orbit.

The pressure pieces 30 are so arranged on the planet wheel 29, that one of the shanks 30a of each angle-shaped shoe orbits parallel to the longitudinal axis 31 of the longitudinal conveyor and to the longitudinal sides of the sweets being conveyed on the longitudinal conveyor, whereas the other shank 30b of the angle-shaped shoe is perpendicular thereto and thus orbits parallel to the front and rear faces 32 of the sweets.

The dog-chain 24 is an endless linked chain 32' arranged in a horizontal plane, which runs around a return wheel 33 in the region of the isolation station 12, which wheel 33 partly projects over the longitudinal conveyor 18 and discharge table 21. On every second link of the link chain 32 a carrier 33' is fastened, which projects into the space 34 surrounded by the chain 32 and each of which carries a dog 35. It can be seen from FIG. 1, that the dog-chain 24 and the transporter 25 are arranged to overlap above the longitudinal conveyor 18 in the region of the isolation station 12 in such a manner, that the dogs 35 of the dog-chain 32' respectively engage between the pressure pieces 30 of the transporter 35, so that they do not mutually interfere. For this the dogs 35 are, like the pressure pieces 30, directed downwards and of such a length that they can engage behind the rear faces of the objects to be isolated 14.

The apparatus works as follows:

The sweets 14 which lie closely behind one another in a row on longitudinal conveyor 18 are each on after the other engaged by a pressure piece 30 in the isolation station 12 and while lying on the conveyor 18 are displaced sideways relative to the row lying on conveyor 18. They thus continue their longitudinal motion, while one of the shanks 30a of the angle-shaped shoe 30 abuts against the side surface of a sweet 14'. As the lateral guidewall 20 ends at that location 36 at which the pressure piece 30 contacts against the side surface of sweet 14', sweet 14' will in FIG. 1 be displaced to the left. The angle-shaped shoe runs in a circular path 37 and, thus simultaneously moves in tangential direction 38 and a radial direction 39, (perpendicular to the longitudinal direction of the longitudinal conveyor belt 18). The spacing (a) between the pressure pieces 30 corresponds to the length (l) of the objects to be isolated and the orientation of transporter 25 to the row of objects 14 can be so adjusted that each pressure piece 30 abuts the side surface of a sweet 14 when the rear face of its shank 30b lies in the same plane as the two abutting faces 32 of the two successive sweets 14' and 14. For, during sideways displacement of sweet 14', the next following sweet 14 abuts with its front face against the transversely running shank 30b of pressure piece 30, which is pushing the sweet 14' sideways. As the pressure piece 30 and the row of sweets lying on longitudinal conveyor 18 are advancing with the same speed in the longitudinal direction, there is no acceleration nor delay of the row of sweets in the region of isolation station 12.

As soon as sweet 14' has reached the position of the sweet referenced 14''' in FIG. 1, in which it has been displaced sideways relative to the row lying on conveyor 18, the dog 35 of the dog-chain 34 engages behind the rear face of the sweet. The velocity of dog 35, whose carrier member 33 is fastened to a chain link, which at this moment is just leaving return wheel 33, has at this time a value which corresponds to the peripheral speed of the transporter, which is equal to the transporter velocity of the longitudinal conveyor 18. As the dog 35 now moves from its circular path in the interior 34 of the dog-chain 24, in which per unit of time it had to travel less, to a straight path, its longitudinal speed increases. The dog 35 engaging behind the sweet 14''' thus accelerates the sweet 14''' so that it separates from the following sweet 14' and spaced from this, is led at a higher speed over discharge table 21 to a packing head (not shown) of a packing machine or into a paper tube, which serves as a wrapping for the sweets.

While dog 35 engages behind the sweet 14 the pressure piece 30 disengages from sweet 14, as it moves along the circular path of transporter 25. Thus, there is no friction with the shank 30a of pressure piece 30 during the accelerated advancement of sweet 14.

The invention is not limited to the illustrated embodiment. For example, it is also possible, to arrange the transporter with the pressure pieces above the longitudinal conveyor 18 and the dog-chain below the discharge table 21, in which there is suitably a slit for the dogs. The dog-chain could also be arranged in a vertical plane, and it is also possible to form the pressure pieces differently, for example as cylinders, or to move them in a different path past the objects moving along longitudinal conveyor 18. This does not exceed the scope of the invention.

Having thus described the invention, the following is claimed:

1. An apparatus for feeding and isolating generally rectangular objects moving at a relatively high speed, said apparatus comprising;

first conveyor means for advancing said objects in side by side relation at a predetermined first velocity along a first path;

an endless flexible element located above said first conveyor means and moving at a second predetermined velocity greater than said first velocity along a second path, said path having at least an arcuate portion crossing over said first path, and a continuous generally straight portion exiting said arcuate portion and generally parallel to said first path, said flexible element including means laterally offset from said flexible element and projecting radially inwardly from said element when said element moves along said arcuate portion, said means including downwardly extending dog members having a component of velocity parallel to said first path which increases as said dog members approach said straight portion and is approximately equal to said first velocity at a predetermined location along said arcuate position, said first and second generally straight paths being spaced and generally parallel and situated in the same horizontal plane, and means at said predetermined location for laterally shifting said objects one at a time from said first straight path to said second straight path, exposing a portion of the trailing surface of said shifted objects to said dog members.

2. The improvement of claim 1 wherein said shifting means is comprised of a plurality of pressure pieces, each of said pressure pieces having a first surface parallel to said longitudinal row of objects and a second surface perpendicular to said first surface, said first surface of one of said pressure pieces engaging each of said objects at said predetermined location and pushing said object laterally sideways, said second surface abutting against the next object in said longitudinal row of objects and said pressure pieces having a longitudinal velocity equal to said first velocity at said predetermined location.

3. The improvement of claim 2, wherein said pressure pieces are fastened to a transporter with a separation between succeeding pressure pieces approximately corresponding to the length of said objects; said transporter adapted to run in a closed path which is curved in at least the region of said predetermined location which path is tangential to the path of said first conveyor means.

4. The improvement of claim 3 wherein said transporter is circular and rotates about an axis perpendicular to the plane of said first conveyor means and said pressure pieces are arranged in a circle and spaced from each other on said circular transporter.

5. The improvement of claim 4 wherein said pressure pieces are angle-shaped shoes fixed to said circular transporter such that said shoes do not change their angular orientation with respect to said first conveyor means during rotation of said circular transporter.

6. The improvement of claim 5 wherein said first conveyor means has lateral guide walls for said objects which terminate at said predetermined location whereat said pressure pieces contact said objects in order to push them sideways.

7. The improvement of claim 6 wherein said lateral guide walls are comprised of a first lateral guide wall on the side of said first conveyor means nearest said transporter and a second lateral guide wall on the side of said first conveyor means opposite said transporter, said second guide wall extending further into said predetermined location then said first guide wall.

8. The improvement of claim 7 wherein said second conveyor means and said transporter are arranged to overlap above said first conveyor means in the region of said predetermined location such that said dog members of said dog means engage said objects between the pressure pieces of the transporter.

9. The improvement of claim 8 wherein said second conveyor means circulates in a horizontal plane and said dog members are directed downwardly from said plane.

* * * * *